United States Patent [19]

Kitamura

[11] Patent Number: 4,898,038
[45] Date of Patent: Feb. 6, 1990

[54] ENGINE STARTING AND CHARGING DEVICE

[75] Inventor: Yutaka Kitamura, Hyogo, Japan

[73] Assignee: Mitsubishi Denki Kabushiki Kaisha, Tokyo, Japan

[21] Appl. No.: 294,639

[22] PCT Filed: Feb. 9, 1988

[86] PCT No.: PCT/JP88/00128
§ 371 Date: Oct. 6, 1988
§ 102(e) Date: Oct. 6, 1988

[87] PCT Pub. No.: WO88/06370
PCT Pub. Date: Aug. 25, 1988

[30] Foreign Application Priority Data

Feb. 10, 1987 [JP] Japan .................. 62-28629

[51] Int. Cl.⁴ .................................. F02N 17/00
[52] U.S. Cl. ............................. 74/6; 74/7 C; 123/179 D
[58] Field of Search ........................ 74/6, 7 C, 9; 123/179 D, 179 R, 179 AS

[56] References Cited

U.S. PATENT DOCUMENTS

| | | | |
|---|---|---|---|
| 1,726,760 | 9/1929 | Otwell | 123/179 D |
| 4,257,281 | 3/1981 | Bunger | 123/179 D |
| 4,456,830 | 6/1984 | Cronin | 123/179 D |
| 4,473,752 | 9/1984 | Cronin | 123/179 D |
| 4,517,466 | 5/1985 | Ogawa | 123/179 D |
| 4,624,351 | 11/1986 | Lutz et al. | 74/7 C |

FOREIGN PATENT DOCUMENTS 54-949 11/1986 Japan.

Primary Examiner—James T. McCall
Attorney, Agent, or Firm—Sughrue, Mion, Zinn, Macpeak and Seas

[57] ABSTRACT

In the present invention, a clutch plate is attached to a crankshaft; revolving-field poles are fixed on this clutch plate; and a magnetic gap is provided between the outer peripheral section of a pair of field cores which hold field coils, and the inner peripheral section of the revolving-field poles. Since a clutch plate material suitable for the accomplishment of clutch function can be selected, it is possible to improve the reliability of the clutch and to avoid giving a heat effect to the revolving-field poles. Furthermore, decreasing the size and weight of the fixed magnetic field can reduce parts cost as well as assembly cost.

7 Claims, 2 Drawing Sheets

ENGINE STARTING AND CHARGING DEVICE

BACKGROUND OF THE INVENTION

1. Field of the Invention

The present invention relates to an engine starting and charging device that a starting motor for starting an engine and a charging generator driven by the engine to charge a battery are formed as one unit.

2. Prior Art

An engine starting and charging device comprising a starting motor and a charging generator as one unit has been suggested as a prior art, for example, one disclosed in laid-Open Japanese Patent No. Sho 61-54949.

FIG. 1 is a sectional view of a prior-art engine starting and charging device disclosed in Laid-Open Japanese Patent No. Sho 61-54959. In FIG. 1, a starting and charging device body 1 comprises revolving field poles 2a, 2b, a field coil 3, an armature core 4, an armature coil 5, and a crank angle detector 6 as major components.

The revolving field poles 2a, 2b are a pair of comb-shaped field poles produced of a ferromagnetic material, which are coupled as a unit through a ring 7 of non-magnetic material such that those magnetic pole sections are disposed alternately in the circumferential direction. The field pole 2a functions as a flywheel and also as a clutch carrier described later, is fitted on an engine crankshaft 8, and fixed on the end of the crankshaft 8 by a bolt 9. Numeral 10 is a cutout formed at the side portion of the field pole 2a, which, combined with the crank angle detector 6, is used to detect the crank angle; the same number of cutouts as the number of magnetic poles of the field pole 2a are provided at equal intervals around the circumference. The width of the cutout 10 in the circumferential direction makes an angle equal to about one half of 360 degrees divided by the number of the cutouts.

The field coil 3, which is for exciting the field poles 2a, 2b, is mounted on the field core 11. This field core is mounted and fixed to a rear plate 12 by bolts not illustrated, facing the field pole 2a across a slight gap a in the axial direction and the field pole 2b across a slight gap b in the diametrical direction.

The armature core 4 is formed by laminating silicon steel sheets, within the inner periphery of which are provided a large number of slots for setting the armature coil 5 therein, the armature coil 5 being of a three-phase distributed winding type as a common commutatorless motor. The armature core 4 is properly positioned and fixed in relation to a mounting frame 13, which is secured by bolts 14 to a rear plate 12 mounted on an engine body not illustrated. Numeral 15 is a spacer for axially securing the armature core 4 to the mounting frame 13, and numeral 16 is a spring ring.

The crank angle detector 6 serves as a signal source that operates an armature current switching circuit not illustrated, and uses an oscillation-type proximity switch. This proximity switch is so mounted on the rear plate 12 that its detecting element faces on the circumferential line where the cutouts 10 of the field pole 2a is provided, and its oscillating conditions vary with the change of inductance at the cutout and non-cutout sections of the field pole 2a, outputting a binary signal "1" and "0" corresponding to the crank angle (field pole position). When a three-phase armature coil 5 is employed, there will be installed three crank angle detectors 6.

Numeral 17 is a clutch which connects the engine crankshaft 8 to, or disconnects it from, a transmission drive shaft 18 for the interruption of power transmission, and uses a diaphragm spring clutch comprising a clutch disc 19, a pressure plate 20, a diaphragm spring (disc spring) 21, wire rings 22, 23, and a clutch cover 24. The clutch cover 24 is mounted by bolts 25 to the field pole 2a. The clutch 17 as such, as is well known, is of the constitution that when a clutch pedal (not illustrated) is not depressed, the tension of the diaphragm spring 21 is exerted to the clutch disc mounted on the transmission drive shaft 18 through the pressure plate 20 by lever ation, pressing this clutch disc 19 against the side of the field pole 2a and accordingly connecting the clutch.

When the clutch pedal is depressed, the sleeve, which is not illustrated, slides in the axial direction, pressing the central part of the diaphragm spring 21 in the direction of the arrow C. Therefore the diaphragm spring 21 deflects back on the wire rings 22, 23 as a fulcrum, thus removing a pressure that has been exerted to the clutch disc 19 to disconnect the clutch, and accordingly shutting off the transmission of power from the crankshaft 8 to the transmission drive shaft 18.

Subsequently, the operation of the starting and charging device of the above-mentioned constitution will be described. When the key switch not illustrated, is turned to the START position, with the engine left stationary, the current flows into the field coil 3 and the armature coil 5, thereby producing a torque at the field poles 2a, 2b to turn the crankshaft 8 directly coupled. When the field poles 2a, 2b have started turning, the crank angle detector 6 detects the positions of the field poles, and the armature current switching circuit switches the current to the armature coil 5 so that the speed of a rotating field formed by the armature coil 5 will be the same as the speed of rotation of the field poles; accordingly the field poles 2a, 2b will gain a torque for further acceleration. The device, thus producing the starting torque by virtue of such a positive feedback operation, starting the engine.

After the engine has started, the speed of rotation of the field poles further increases, thus increasing a back electromotive force produced at the armature coil 5; accordingly no unnecessary starting current will flow.

Furthermore, when, after the starting of the engine, the key switch is placed in the IGNITION position, the starting and charging device body 1 operates as an a.c. synchronous generator, which produces the electric current. The current thus produced is converted into the direct current by means of a converter which is not illustrated, and supplied to batteries and electrical equipment mounted on the motor vehicle.

The field pole 2a used in the prior-art engine starting and charging device, servicing also as an engine flywheel as stated above, must be much thicker than required to form a necessary magnetic path to support a centrifugal force to be applied to the rotating field poles 2a, 2b. Therefore it has such a problem that its weight will become excessive more than necessary.

Furthermore, the field poles 2a, 2b, constituting the magnetic path, are required to be produced of such a material of high permeability as S10C. Such a material, however, has low wear resistance and therefore is not suitable on account of low function as a clutch plate which comes in contact with the clutch disc 19.

Furthermore, there is a problem that the field pole 2a rises in temperature due to frictional heat caused by the connection and disconnection of the clutch 17, resulting in lowered operating characteristics.

Furthermore, the prior-art fixed field, made of the field core 11 of complicated configuration with the field coil 3 wound around as illustrated, has such a problem as low manufacturing and assembling efficiency, and accordingly it is hard to fix this field coil 3.

SUMMARY OF THE INVENTION

The present invention has been accomplished in an attempt to solve the above-mentioned problems, and has as its object the provision of an engine starting and charging device having a fixed magnetic field that has been decreased in size and weight without impairing functions as a clutch and field poles, and is capable of reducing parts cost as well as assembly cost.

In the engine starting and charging device relative to the present invention, a clutch plate is mounted on the engine crankshaft; revolving-field poles are fixed on this clutch plate; and a magnetic gap is provided between the outer peripheral section of a pair of field magnetic cores for holding the field coil and the inner peripheral section of the above-mentioned revolving-field poles.

In the present invention, since the clutch plate and the revolving-field poles are separate parts, the reliability of the clutch can be improved and the revolving-field poles can be protected from an effect of heat by choosing, for the clutch plate, a material suitable for performing the function of clutch and also by choosing a material of excellent magnetic characteristics for the revolving-field poles. Further, a wide surface area in relation to the revolving-field poles can be provided and magnetic path resistance at the gap area reduced by holding the field coil with a pair of field cores to provide a magnetic gap around the outer periphery of the field core.

BEST MODE OF THE INVENTION

A preferred embodiment of the present invention will now be described by referring to the accompanying drawings.

Figure 2:
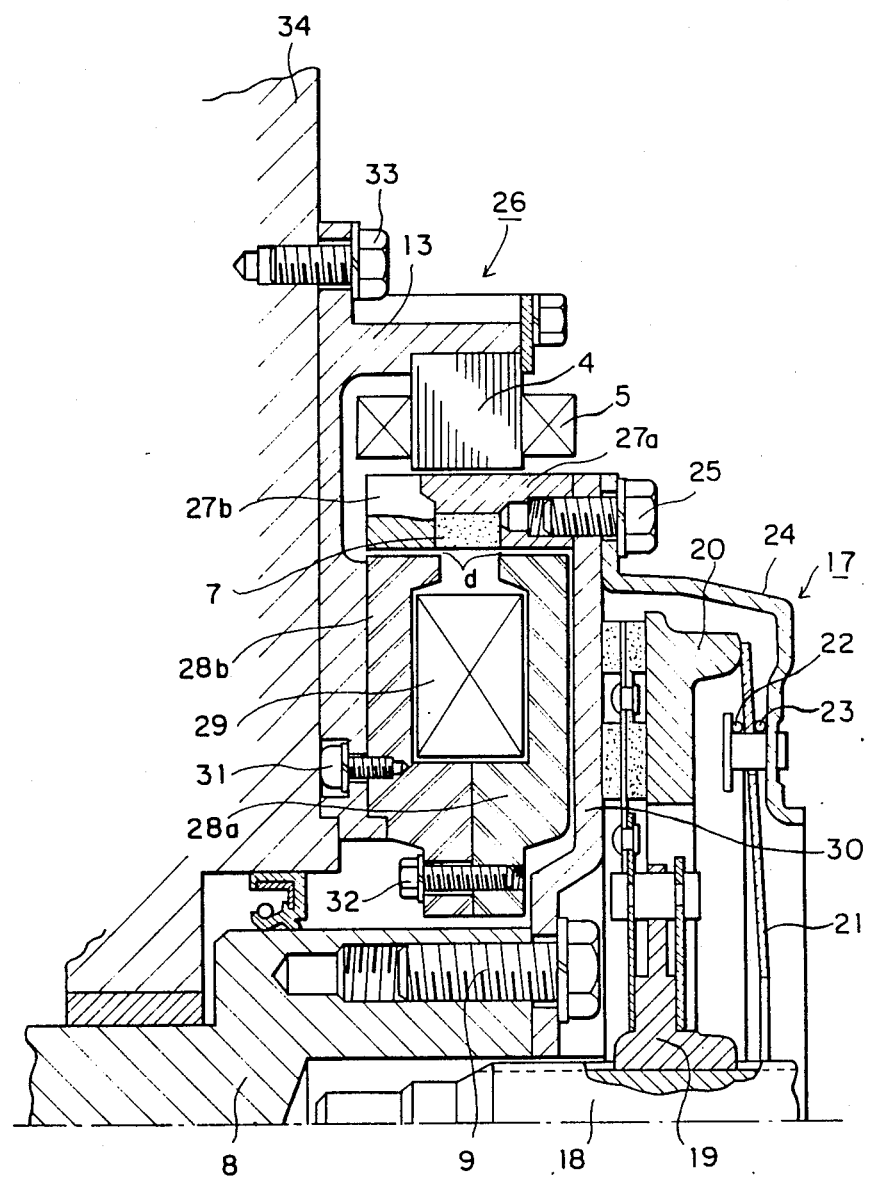
FIG. 2 is a sectional view showing an engine starting and charging device in accordance with one embodiment of the present invention.

FIG. 2 is a sectional view showing the engine starting and charging device in accordance with one embodiment of the present invention. In this drawing, numeral 26 is a starting and charging device body, which comprises revolving-field poles 27a, 27b, field cores 28a, 28b, field coil 29, an armature core 4, an armature coil 5, and a crank angle detector, which is not illustrated in FIG. 2, as major components.

Furthermore, numeral 30 is a clutch plate mounted by bolts 9 on the engine crankshaft 8. It is produced of a high wear-resistant material. To this clutch plate 30 are secured the revolving-field poles 27a, 27b together with the clutch cover 24 by the bolts 25.

The field cores 28a, 28b form one pair; the field coil 29 is held in complementary U-shaped recesses defined by this pair of field cores 28a, 28b. A magnetic gap d is formed between the outer peripheral section of a pair of field cores 28a, 28b and the inner peripheral surface of the revolving-field poles 27a, 27b.

Numeral 31 is a bolt for fastening the field core 28b to the bracket 13 which is a mounting frame; numeral 32 is a bolt for securing a pair of field cores 28a and 28b; and numeral 33 is a bolt for mounting the bracket 13 to an engine body 34.

Figure 1:
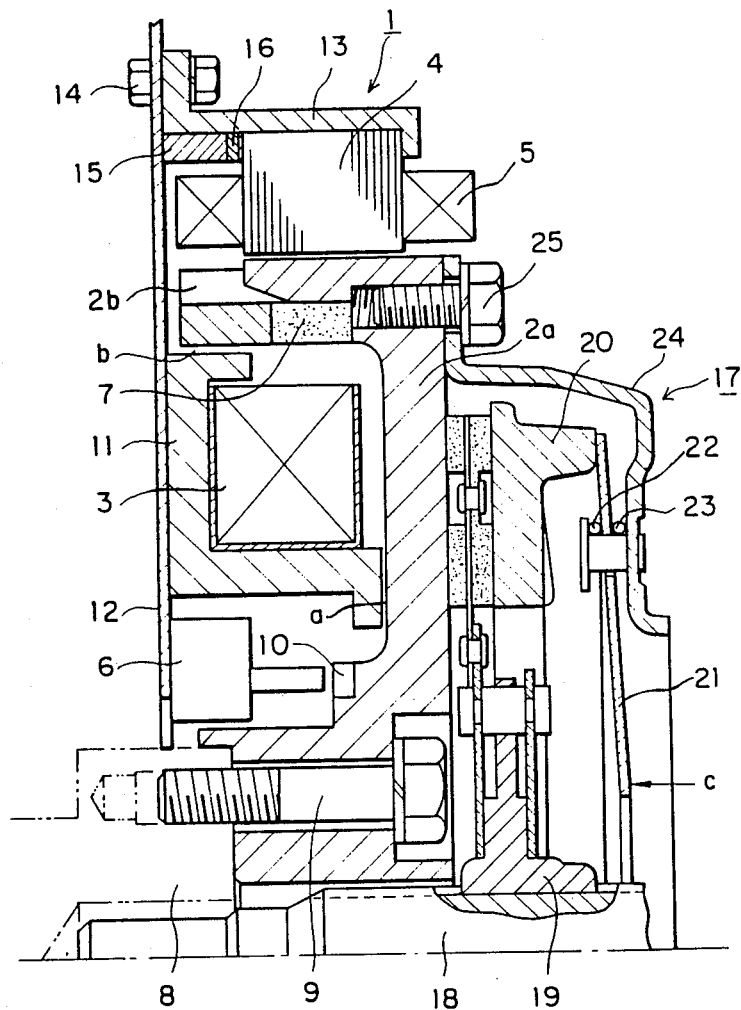
FIG. 1 is a sectional view of a prior-art starting and charging device.

Since the remaining element are similar to those of the prior-art device in FIG. 1, the same numerals are used for corresponding parts, the description of which, therefore, will be omitted.

In the engine starting and charging device of the aforementioned construction, because the function of a clutch plate has been separated from the revolving-field poles 27a, 27b and the clutch plate 30 produced of a high wear-resistant material has newly been added, an optimum arrangement is selectable for the clutch 17. Further, the revolving-field poles 27a, 27b can be decreased in thickness to a value required for their use as magnetic paths, and besides simplified in configuration.

Therefore, the field coil 29 is held by a pair of field cores 28a, 28b and the fixed magnetic field can be reduced in size and weight. Since the revolving-field poles 27a, 27b are separate from the clutch plate 30, it is possible to prevent the temperature rise of the revolving-field poles 27a, 27b caused by the operation of the clutch 17 and the lowering of their magnetic characteristics.

Furthermore, since the gap d is formed at two places on the outer peripheral section of the field cores 28a, 28b, between the field cores 28a, 28b and the revolving-field poles 27a, 27b in a brushless construction, the field cores 28a, 28b and the revolving-field poles 27a, 27b at the gap area can be provided with a wide opposite surface area, and, therefore, the magnetic path resistance in this gap area can be decreased.

Starting the engine, charging the battery, and clutch 17 operation, being identical to those of the prior art, will not be described herein.

What is claimed is:

1. An engine starting and charging device having a starting and charging device body which comprises revolving field poles rotating with an engine crankshaft as a unit, field coils wound around field cores, and an armature coil wound around an armature core, characterized in that a clutch plate is mounted on said crankshaft, said revolving-field poles are fixed on said clutch plate, and a magnetic gap is provided between the outer peripheral section of a pair of field cores which hold said field coil therebetween and the inner peripheral section of said revolving-field poles.

2. An engine starting and charging device as claimed in claim 1, wherein a clutch plate is formed of high wear resistant material.

3. An engine starting and charging device as claimed in claim 1, wherein said pair of field cores have complementary recesses of U-shaped section in opposite surfaces for holding said field coil.

4. An engine starting and charging device as claimed in claim 1, wherein said pair of field cores are secured together with said armature core to a bracket and said bracket is mounted to said engine body.

5. An engine starting and charging device as claimed in claim 1, wherein said revolving-field poles are disposed on one surface of said clutch plate and a clutch cover on the other surface, these three parts being installed and fastened by common bolts as one unit.

6. An engine starting and charging device having a starting and charging device body which comprises revolving field poles rotating with an engine crankshaft as a unit; field coils which excite said revolving-field poles; an armature core secured to a bracket mounted on the engine body; and an armature coils wound around it; said starting and charging device body operating as a starting motor by switching the direction of the current flowing into said armature coil such that said armature coil will form a revolving field having a fixed phase difference in relation to the magnetic field of said revolving-field poles, and, after the engine has started, a battery will be charged with a voltage generated at said armature coil, characterized in that a clutch plate which comes in contact with a clutch disc for the interruption of torque transmission from said crankshaft is mounted on said crankshaft; said revolving-field poles are secured on this clutch plate; and a magnetic gap is provided between the outer peripheral section of a pair of field cores holding said field coils and the inner peripheral section of said revolving-field poles.

7. An engine starting and charging device as claimed in claim 6, wherein a crank angle detector is provided to detect the angle of rotation of said revolving-field poles and switches the direction of the electric current flowing into said armature coil according to this signal of detection.

* * * * *